United States Patent [19]

Briand

[11] Patent Number: 4,925,512
[45] Date of Patent: May 15, 1990

[54] METHOD FOR CONTINUOUSLY MANUFACTURING PRODUCTS OF THERMOPLASTIC MATERIAL AND EQUIPMENT FOR CARRYING OUT SAID METHOD

[75] Inventor: Jean P. Briand, Fontaine-les-Luxeuil, France

[73] Assignee: Sonoco Gunther S.A., Fontaine-les-Luxeuil, France

[21] Appl. No.: 105,471

[22] Filed: Sep. 30, 1987

Related U.S. Application Data

[63] Continuation of Ser. No. 502,031, Jun. 7, 1983, abandoned, which is a continuation-in-part of Ser. No. 398,520, Jul. 15, 1982, abandoned.

[30] Foreign Application Priority Data

Jun. 11, 1982 [FR] France .................. 82 10287

[51] Int. Cl.⁵ .................. B32B 31/20; B32B 31/30
[52] U.S. Cl. .................. 156/201; 156/202; 156/244.12; 156/244.19; 156/461; 156/465; 264/148; 264/151; 264/160; 264/171; 264/175; 264/211.12; 264/211.21; 264/285
[58] Field of Search .................. 156/145, 199–202, 156/244.11, 244.12, 244.18, 244.19, 244.22, 244.27, 242, 243, 277.2, 273.7, 459, 465, 461, 466; 425/131.1; 264/212, 145, 148, 151, 157, 160, 171, 175, 176.1, 211.12, 211.21, 212, 239, 280, 284, 293, 299, 285, 210.2

[56] References Cited

U.S. PATENT DOCUMENTS

| | | | |
|---|---|---|---|
| 2,620,513 | 12/1952 | Cryor | 264/285 |
| 3,136,676 | 6/1964 | Fisch | 156/244.12 |
| 3,174,887 | 3/1965 | Voelkor | 156/202 |
| 3,454,694 | 7/1969 | Delairie | 264/151 |
| 3,622,418 | 11/1971 | Black | 264/151 |
| 3,655,428 | 4/1972 | Geschwender | 156/202 |
| 4,056,593 | 11/1977 | deNavas Albareda | 264/151 |
| 4,088,721 | 5/1978 | Apicella, Jr. | 264/151 |
| 4,156,752 | 5/1979 | Riccitiello | 264/151 |
| 4,234,530 | 11/1980 | Thiel | 264/151 |
| 4,234,536 | 11/1980 | Thiel | 264/151 |
| 4,302,259 | 11/1981 | Steinberg et al. | 156/243 |
| 4,314,867 | 2/1982 | Berger et al. | 156/242 |
| 4,612,152 | 9/1986 | Kawabata | 264/210.2 |

FOREIGN PATENT DOCUMENTS

2455968 12/1980 France .
2489211 3/1982 France .

Primary Examiner—Merrell C. Cashion, Jr.
Attorney, Agent, or Firm—Dennison, Meserole, Pollack & Scheiner

[57] ABSTRACT

The method ensures that the core of thermoplastic material of the product is completely enveloped by a continuous covering formed by at least one sheet of a flexible material. Equipment for carrying out the method comprises an extruder 7 for delivering the thermoplastic material in a pasty state and in the form of a rod 16–18 having a regular section, means 20 for unrolling under this rod a sheet 19 of a flexible material, means 34 and 41 for completely enveloping said rod with said flexible material, and means for pulling on said sheet of flexible material and conveying the rod to calendering rolls 43 and 44, and means 46 for forming and means 47 for cutting to the desired length said rod which is thus completely enveloped by said sheet of flexible material. This equipment is applicable to the manufacture of shapes and plates for in particular the packaging and transportation of products.

17 Claims, 4 Drawing Sheets

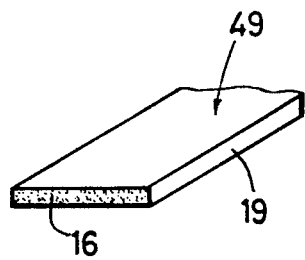
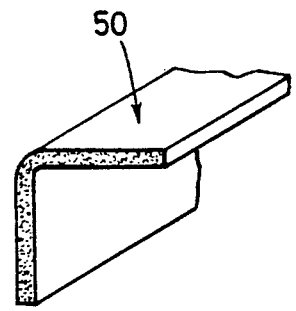
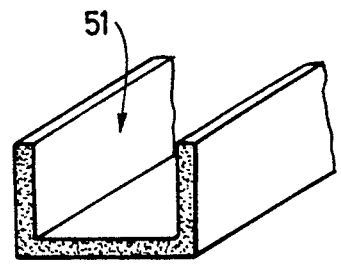
FIG. 3a  FIG. 3b  FIG. 3c
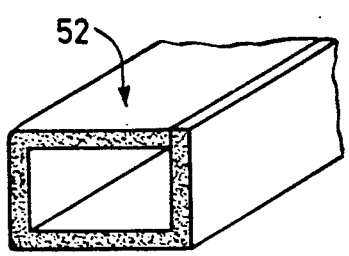
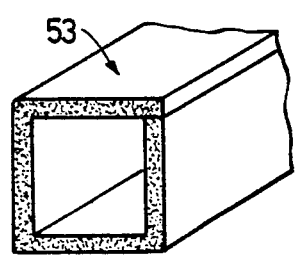
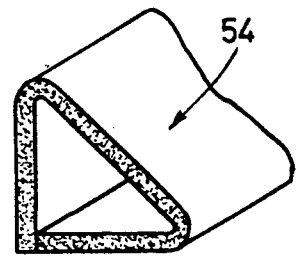
FIG. 3d  FIG. 3e  FIG. 3f

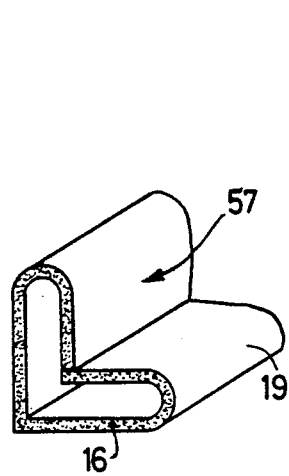
FIG.3i
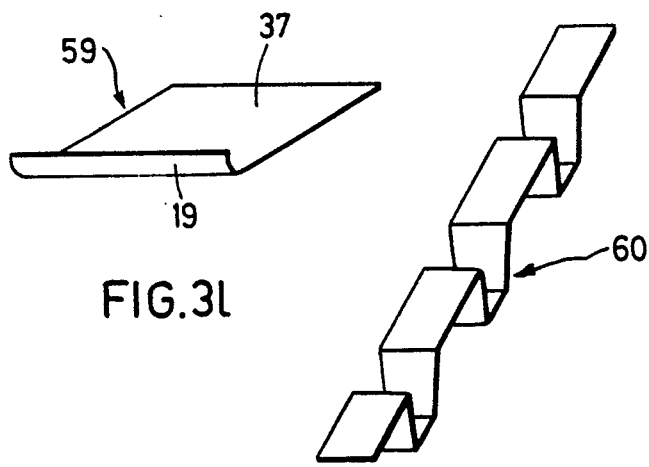
FIG.3l
FIG.3m
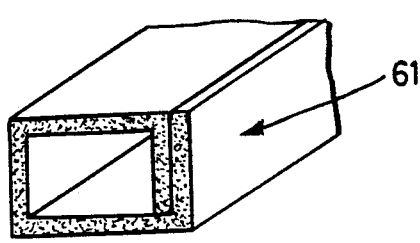
FIG.3k
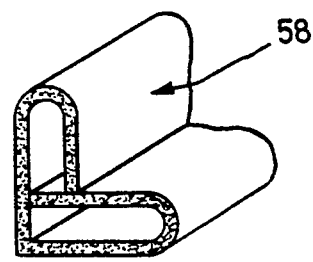
FIG.3j
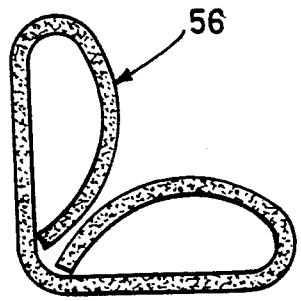
FIG.3h
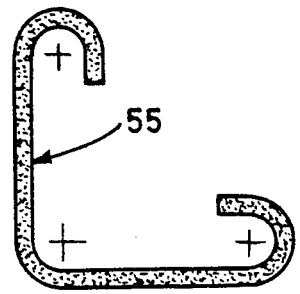
FIG.3g

METHOD FOR CONTINUOUSLY MANUFACTURING PRODUCTS OF THERMOPLASTIC MATERIAL AND EQUIPMENT FOR CARRYING OUT SAID METHOD

CROSS-REFERENCE TO RELATED APPLICATION

This application is a continuation of earlier abandoned application Ser. No. 502,031 filed June 7, 1983 which is a continuation-in-part of earlier abandoned application Ser. No. 398,520 filed July 15, 1982.

BACKGROUND OF THE INVENTION

The present invention relates to the continuous manufacture of elongated products such as shapes or plates which have a core of thermoplastic material which may or may not contain a filler and is protected by at least one sheet of flexible material.

The object of the present invention is to provide: a new method in which the core of the product is completely enveloped by at least one sheet of flexible material at the end of the manufacture; equipment for carrying out said method; elongated products obtained by means of said specific method and having an original common feature of comprising a core and a covering of a flexible material which covers said core and continuously extends throughout the periphery of the core including the two longitudinal edges thereof.

It is known from the most recent techniques to construct shapes and plates of the most diverse sections each of which comprises a core of a thermoplastic material which may or may not contain a filler and is sandwiched between two sheets of a flexible material such as paper, cardboard or a polyethylene film.

The products concerned all have throughout their length and from one transverse end to the other transverse end a section which is of strictly constant shape and thickness whatever be said section.

Consequently, these products are obtained either directly by extrusion out of a die having the suitable section, or by calendering and/or forming between the rolls or cylinders of a rolling press device, the last two operations being if desired combined with the operations of grinding, washing, sorting out, heating, reheating, degassing, shredding, cutting, calibrating, spreading, pressing, coating, thermoforming, welding, and even if desired injection, extrusion or intrusion when the material in the pure or mixed state constituting the core of the elongated product to be produced is pressed, heated and homogenized by an extrusion screw which continuously urges the material through a heated cylindrical barrel to a die constituting the outlet of the extruder.

It is for example known from French patent No. 80.10508/ 2 455 968 to manufacture continuously products of plastics material in particular from scrap or recycled materials, this method comprising heating the mat of plastics material to its softening point, placing under and on said mat a polyethylene film and introducing the sandwich consisting of the mat and the two films between the rolls of calendering devices which ensure the adhesion of the mat to the films and consequently the cohesion of the sandwich and the bringing of the final product to the desired thickness.

It is known from the French patent application No. 81. 16574 to form laminated structures of cardboard in which a thermoplastic material which is virgin or scrap material and reduced to particles, is sandwiched between two sheets of cardboard, the sandwich being thereafter heated, compressed, formed, cooled and cut to length.

If desired, there are placed between the respectively upper and lower layers of cardboard in alternating relation a plurality of layers of thermoplastic material and a plurality of layers of cardboard so as to vary the thickness of the final product and impart thereto suitable mechanical characteristics, said superposed layers of cardboard and thermoplastic material being together subjected to the heating stage and then the pressing stage so that the thermoplastic material brought to the molten state adheres perfectly and definitively to each of its layers and to the two surrounding layers of cardboard.

The elongated products, namely shapes and/or plates, obtained by means of one of the two aforementioned methods all have the same drawbacks:

in the course of the pressing and calendering operations, the molten thermoplastic material flows or seeps along the two longitudinally extending edges of the sandwich and results in surface defects and in particular in burrs and traces of trickling which spoil the appearance (they must be ground or sawn off in the course of the last forming and cutting operations), and adversely affect the mechanical properties of the finished product since any flow or trickling of the thermoplastic material lowers the strength and the cohesion of the finished product;

the thickness of the finished product is necessarily great owing to the discontinuity between the upper and lower layers covering the core of thermoplastic material; the absence of direct connection between the outer layers, which has an adverse effect on the rigidity and strength of the finished product, can only be remedied by a substantial increase in the thickness of the thermoplastic material sandwiched between said outer layers.

It is also known to produce plates or shapes directly by the extruder through dies of respectively I or V shape, said plates and shapes being made from a virgin or recycled thermoplastic material which may or may not have a filler and is cooled as soon as it emerges from the die so as to avoid deformation of the extruded plate or shape.

In this respect, it must indeed be realized that the extruder works a material in the molten state and delivers a soft material which has no firmness and consequently cannot be allowed to hang freely and on which no pull can be exerted owing to risk of deformation and even rupture of the extruded ribbon or shape.

The extruder is a kind of simple pump at the outlet of which the delivery of the thermoplastic material is not "organized."

Consequently, at the present time, in order to use a more consistent product, the "rope" or rod of material delivered by the extruder is cooled under a vacuum or water bath. This cooling step is very slow and is all the slower as any plastics material, and in particular polyethylene, is a "heat trap" and the cooling to the heart of the rod is considerably slower than a simple surface cooling.

For example, it has been found that, for a given volume of material extruded by an extruder, the suitable output rate of the die varies mainly as a function of the section of the extruded product and more precisely as a function of the exchange surface that the material exposes to the air. Thus in respect of a thin tube of large diameter, the limit extruding rate is 30 m per minute, in respect of a plate of great width, the limit extruding rate drops to 20 m per minute and in respect of a solid cylindrical rope or rod, the limit extruding rate is reduced to between 5 and 6 m per minute.

Beyond these extruding rates, the products deform, become crushed, spread or tear.

The considerable differences observed between the aforementioned figures clearly show that it is the cooling time of the plastics material which determines the rate of extrusion of said material.

In other words, a given extruder, in respect of which in particular the normal production rate resulting from tests carried out by the constructor is given in the technical specifications, is never used at its normal rate of production but at a much lower rate adopted by the user in accordance with the shape and thickness of the section of the product to be extruded.

In order to mitigate this lower rate of production, it has been envisaged to associate the plastics material delivered by the extruder with additional protective devices in particular for avoiding the deformation or tearing of the material and allowing higher extruding rates. However, in such cases, the lengths over which the extruded products should be protected from any mechanical forces (tensile, compression, torsion, gravity) are so considerable that in each extruding workshop a large amount of space required for the correct cooling of the thermoplastic material would be lost on the output side of each extruder.

Moreover, in practice, rather than lose large amounts of space in the workshops, it is preferred to reduce the extrusion rate to the values of 5 to 6 m per minute for a solid cylindrical rope or rod, 20 m per minute for a wide panel and 30 m per minute for a tube of large diameter.

At these extrusion rates, so long as the effects of gravity are avoided or at least limited, it is possible to convey the soft plastics material, without risk of deformation, on condition that it is conveyed as soon as it emerges from the die, to an endless conveyor belt whose rate of advance is equal to the rate of extrusion of the material through the die.

In conclusion, while it is possible to manufacture directly from the extruder shapes and plates of thermoplastic material whose contours are relatively flawless, such a technique has two major drawbacks:

it can only be employed at low extrusion rates out of the die, which rates decrease with increase in the thickness of the shape or plate;

it produces finished products which have poor mechanical properties—namely the mechanical properties of the thermoplastic material—and a poor finished appearance, and the thermoplastic material can neither be printed nor covered, and very often it consequently does not satisfy the required standards in the field of the food industry.

There is also known a method termed the "REGAL" method developed by the British firm PLASTIC RECYCLING in which thermoplastic waste reduced by grinding is fed to a converter which has:

a first heating zone followed by a calendering zone;

a passage between two endless belts which advance continuously and have confronting surfaces which slightly converge toward the output end so that the pinching thus created slightly compresses the plastics material;

a second heating zone at the entrance of the device comprising the two belts and a cooling zone at the exit of these belts.

After cutting, the panels obtained by the REGAL method are employed in the fields of furniture, packaging, handling, public works and insulation of buildings.

The products obtained by this method unfortunately combine all the drawbacks mentioned in respect of the other methods, namely:

their mechanical properties are exclusively those of the worked thermoplastic material, which implies that the product must have a great thickness to ensure satisfactory rigidity and strength;

the longitudinally extending edges of the plate of thermoplastic material delivered at the exit of the two compressing belts has many defects due to the flow or seeping of the thermoplastic material so that additional grinding or sawing operations are required to obtain a burr-free finished product;

the finished products cannot be printed, have a poor finish and do not satisfy the standards of the food industry;

the manufacture of the products, and in particular the passage through the endless belts, is carried out at a very low speed in order to avoid rupture or splitting of the material when it is pinched.

The present invention has for object to overcome all the aforementioned drawbacks and consequently proposes a method which avoids the flowing or seeping phenomenon and at the same time allows a considerable increase in the production rates, in particular by permitting an increase in the rates at which the thermoplastic material is worked upon at the outlet of the extruders and at the entrance of the calendering rolls.

Further, the elongated products produced by the method of the present invention have a flawless finish which moreover accepts various types of marking and have notably improved mechanical properties so that it is now possible to manufacture shapes and plates which are much thinner for given properties.

Consequently, a first object of the present invention is to provide a method for continuously manufacturing elongated products which have a core of thermoplastic material which may or may not include a filler and is protected by at least one sheet of a flexible material, said method comprising the known steps of: heating the thermoplastic material so as to bring it to its softening temperature, assembling said thermoplastic material with its protective sheet or sheets, calendering this assembly so as to adhere the sheet or sheets to the thermoplastic material, forming said assembly by passage between rolls of a forming machine and cutting the assembly into sections of the desired length, said method being characterized by the steps of placing the softened thermoplastic material on its protective sheet in the form of a rod of regular section, conveying said rod to the calendering rolls by pulling on its protective sheet, at the same time completely enclosing said rod in a covering, either by closing the protective sheet onto itself or by covering the rod with a second sheet whose edge portions overlap the edge portions of the first sheet, and effecting the operations of calendering, forming, and cutting to length on the rod thus fully enveloped.

By placing the rod of hot and softened thermoplastic material directly on its protective sheet immediately as it emerges from the machine (extruder, calender, tunnel oven, press heating with gas jets or infrared ray panels, mixer heating with a blow pipe, heating by conduction or radiation) employed for bringing the thermoplastic material to its softening temperature, it is possible to pull on said protective sheet without altering the rod of plastics material.

Consequently, it is now possible to optimize the production rate of the machine used for softening the plastics material without the handicap of the cooling at the output end of said machine.

Many materials provided in the form of sheets—paper, cardboard, cloth, fibreglass, a complex of cardboard and polyethylene or cardboard and aluminium and polyethylene—are compatible both with the temperature at which the thermoplastic material emerges from the machine in which it was softened (about 140° C.), and with the protection of said thermoplastic material, that is to say at the moment of the covering of said plastics material a simple pressure is sufficient to cause the protective sheet to adhere definitively to the plastics material and form therewith a composite unit which is indivisible at the normal conditions of temperature, pressure, humidity and ambient atmosphere.

Consequently, the machine employed for softening the thermoplastic material can operate at its normal rate.

By pulling on the protective sheet instead of pulling on the rod of softened material avoids any risk of breaking the rod. The new limits in the carrying out of such a method are increased considerably and the new standard to satisfy is now that of the resistance to stretching of the protective sheet when, as it carries the rod of softened thermoplastic material, it is pulled so as to convey it to the calender rolls.

In a preferred manner of proceeding, the thermoplastic material, which may or may not include a filler, is softened in an extruder preferably associated with a degassing system.

Among the various equipment suitable for softening the thermoplastic material, the extruder is the machine which ensures the best homogenization of the material and also guarantees the highest output of treated material and consequently results in a higher rate of production.

In a preferred manner of carrying out the method, the thermoplastic material is extruded at a maximum temperature in the neighbourhood of 140° C. and, as soon as it is placed on its protective sheet and without being concerned in any way with its cooling, the rope or rod of thermoplastic material is conveyed to the calender rolls while simultaneously closing the protective sheet around said rod and the rod is calendered while it is still at a sufficiently elevated temperature of the order of 100° to 120° C.

By working on the rod in the calender while it is still hot, it is very easy to deform the rod, flatten it progressively and deliver it at the output of the calender in the form of a flat strip which is itself still sufficiently hot to be in turn worked upon and put into the most various shapes by passage through a roll-forming machine.

Thus, after the calendering operation and again without being concerned in any way with the cooling of the rod enveloped in the protective sheet, the enveloped rod is put into its final shape by deforming it in a roll-forming machine while it is at a temperature of the order of 80° to 100° C.

Also according to a preferred manner of carrying out the method, the rod is extruded at a rate of at least 20 m per minute and it is immediately taken up with the protective sheet and conveyed at the same rate to the calender, which constitutes a marked improvement in the production rate relative to known methods which allow rates of extrusion of the solid rod at the most equal to 6 m per minute.

The protective sheet which receives the rod of softened thermoplastic material is wide enough to envelope completely and continously the rod after it has been flattened and then put into its sectional shape corresponding to its utilization, and in this case the two longitudinally extending edge portions of the sheet overlap each other. By way of a modification, the protective sheet which receives the rod of softened material has a width which is only slightly larger than that of the shape or panel finally put into the required shape, and in this case the sheet constitutes a first lower support which is associated before the calendering with a second sheet of the same type and width which constitutes the upper support so that the rod is fully covered, the edge portions of the second sheet overlap those of the first sheet, and here again the rod is fully enveloped in a protective film to which it fully adheres.

The protective sheet or sheets which surround the rod made from sheets of paper or cardboard or from sheets of cloth, sheets of fibreglass, sheets of a complex comprising cardboard and polyethylene or cardboard, aluminium and polyethylene.

All these materials have the common feature of resisting temperatures distinctly higher than 160° C. and therefore temperatures higher than the temperature of the rod of softened material emerging from the extruder and of resisting tractions corresponding to production rates or speeds considerably higher than that of 20 m per minute.

It is moreover known that the hot and soft thermoplastic material adheres perfectly to these various materials proposed by way of coverings after compression and cooling.

Consequently, all the covering materials mentioned above are perfectly suitable for carrying out the method of the invention.

The thermoplastic used is either a virgin material, which may or may not contain a filler, or scrap material which is recycled for reducing in this way the cost of carrying out the invention.

There are therefore three possible supplies of thermoplastic waste: the scrap of polymer producers, the scrap which is not directly recyclable from transformers, and waste coming from the final users and in particular from packages, films and bags (agriculture, industry, commerce).

The invention appears to be of very great interest in this respect since it permits the re-use of all the thermoplastic scrap materials, all the sources of waste which is at the present time burnt, the sole condition to satisfy being that the fillers possibly associated with the thermoplastic material do not constitute more than 60% of the mixture by weight so that the thermoplastic material is in sufficient amount to guarantee good adherence to the protective covering and consequently an excellent cohesion of the composite structure comprising the thermoplastic core containing a filler and the protective covering.

In any case, the invention permits the re-use of thermoplastic material polluted by fillers representing more than 60% of the mixture by weight, said contaminated thermoplastic material being in such cases mixed in the extruder with a virgin thermoplastic material so that finally the material homogenized by the extruder comprises at least 40% by weight of thermoplastic material.

The fillers mixed with the thermoplastic material may be of very diverse origins: it may concern fibres, for example cloth, paper, cardboard or other cellulosic fibres and even contaminated and damp fibres coming from paper-making, fibreglass, asbestos or wood fibres; it may also concern a powder of talc, kaolin, silica, aluminium or wood sawdust; it may further be a fine and light wire of aluminium, iron or even a ribbon, i.e. a flexible metal ribbon or plastics ribbon.

In the case of fibre fillers, these are preferably long fibres and advantageously they have a length of at least 2 mm so as to impart excellent properties of rigidity to the final product.

According to the method of the invention, the thermoplastic material must be finely ground and reduced to a sufficient homogeneous state before introduction into the extruder.

Consequently, all plastics waste may be recycled and therefore valorized so long as they possess or are mixed with an amount of filler which does not exceed 60% by weight.

As another consequence, the present invention therefore permits the re-use of a starting material employed in paper-making and at the present time scrapped, namely the polyethylene+aluminium+cellulose fibre complex which is never recycled because aluminium is considered as a contaminant inseparable from the other two constituents.

Thus, while it is at the present time rather conventional to regenerate polyethylene+cellulosic fibres complexes, such as paper or cardboard, the polyethylene+cellulosic fibres+aluminum complexes constitute a large part of waste products unfortunately considered unsalvageable.

In allowing without limit the re-use of these last-mentioned complexes, the present invention therefore provides satisfactory solutions from the point of view of the campaign against pollution by providing for the full use of an inalterable source of waste products, and satisfactory solutions from the purely economic point of view by the use of a product which costs nothing.

Another object of the present invention is to provide equipment for carrying out the method defined hereinbefore, said equipment being characterized in that it comprises:

an extruder for delivering thermoplastic material, which may or may not contain a filler, in the form of a rod of regular section and in the pasty state;

means for unrolling a sheet of a flexible material under this rod;

means for totally enclosing this rod by means of said flexible material, either by closing onto itself the sheet on which the rod rests, or by covering the rod with a second sheet whose edge portions overlap the edge portions of the first sheet;

means for pulling on at least the first sheet and conveying the rod to the calendering rolls;

known means for calendering, forming and cutting to length the rod which is entirely enveloped.

A third object of the present invention is to provide a product, and in particular an elongated product, such as a shape or a plate whose core is of thermoplastic material, which may or may not contain a filler, and is protected by at least one sheet of a flexible material, said product being characterized in that the sheet or sheets entirely and continuously envelop the core by overlapping its two longitudinally extending edges.

In this product, the thermoplastic material, such as for example a polyethylene or a polyvinyl chloride, serves as a binder between the various solid fillers on one hand, and a binder with the covering surrounding the core on the other hand.

In this respect, the use of a cardboard-polyethylene complex or a cardboard-aluminum-polyethylene complex for the covering may afford an additional advantage in that the polyethylene of the complex still further improves the attachment of the core of thermoplastic material to the covering.

In the product defined hereinbefore, the adhesion of the core of thermoplastic material, which may or may not contain a filler, to the sheet or sheets surrounding it continuously results in a composite structure whose properties exceed the cumulative properties of its various constituents.

The synergic effect between the core and the covering is revealed in particular from the examination of the mechanical properties of the finished product, the latter having an excellent resistance to elongation, and an excellent compressive, bending and torsional strength; the probable reason for this synergic effect is that the protective covering continuously covers the core including along its two longitudinally extending edges, that there is therefore a coherent bond between all the points of the covering and that there is moreover a coherent bond between all the points of the product because the core is intimately connected to the covering by adhesion.

The final; product obtained also has all the properties of thermoplastics and all the properties of the covering. There may be mentioned for example:

its impermeability due to the plastics material, its thermoplasticity, its printability due to the covering, its good performance under cold conditions, also due to the covering, its obvious compatibility with food products, since it is sufficient that the material of the covering, i.e. the sole material in contact with the outside environment, satisfy food standards, its well-finished appearance, the continuous covering affording a regular, smooth surface avoiding the surface defects of the plastics material which are all the more apparent and pronounced as the amount of filler is greater.

In the case where the thermoplastic material constituting the core of the product contains a filler, the finished product obtained also has the properties of the filler, whence in particular a further improvement in its resistance to elongation and/or to compression and/or to crushing and/or to bending and/or to torsion depending on the type and amount of filler employed.

In order to provide a better explanation of the present invention, there will now be described, merely by way of non-limiting examples, various embodiments of the invention with reference to the accompanying drawings in which:

FIGS. 3a to 3m represent various sections of the shapes and plates which may be made with either of the equipments of FIGS. 1 and 2 by the method according to the invention.

Figure 1:
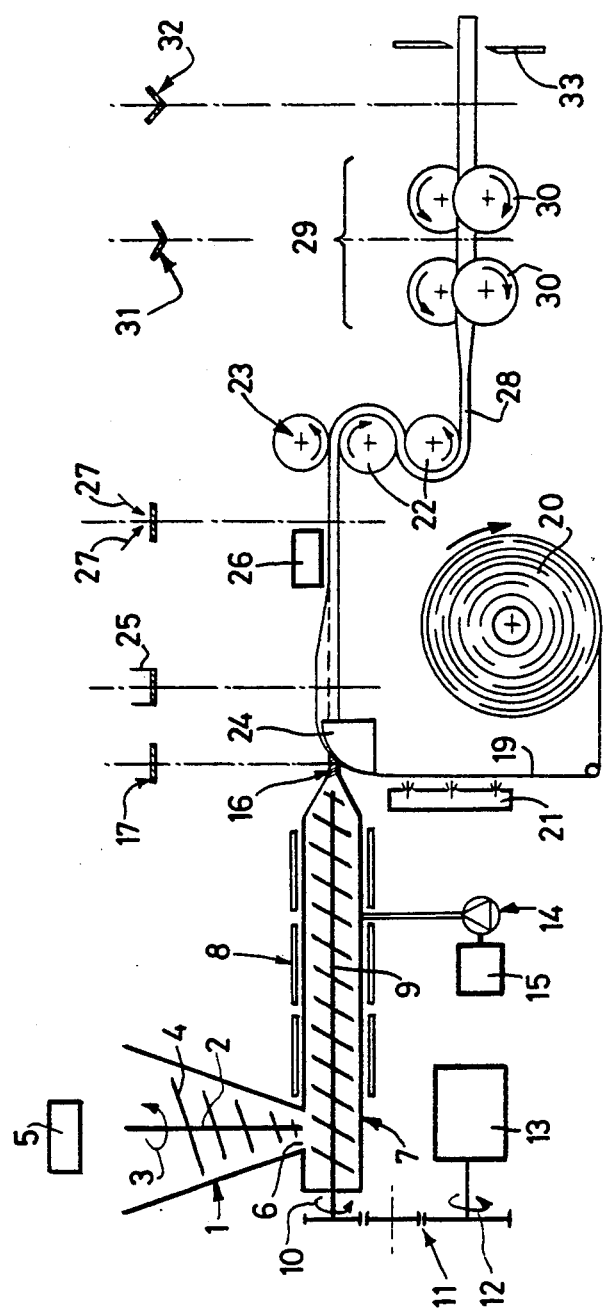
FIG. 1 is a diagrammatic view of a first embodiment of equipment for carrying out the method of the invention, which embodiment is more particularly provided for manufacturing shapes enveloped in a sheet which is closed onto itself.

With reference to the drawings, the reference numeral 1 designates a supply hopper associated with a pressure-applying screw 2 which, in rotating at 3 about its vertical axis, drives in rotation fins or blades 4. The hopper 1 is fed with thermoplastic waste products of all kinds, films, packages, milk packages, various papermaking scrap products, which are reduced, above the hopper 1, to a sufficiently fine homogeneous state by means of a soundproof grinder having cutters diagrammatically represented by the rectangle 5.

The material fed into the hopper 1 may also be a virgin thermoplastic material, which may or may not contain a filler or fillers, in the form of textiles, paper, aluminium, wood sawdust or fine and long fibres of glass or fibres of metal.

The outlet of the hopper 1 directly feeds the product to the inlet 6 of an extruder 7 comprising a cylindrical barrel provided with heating resistances 8 and a central extrusion screw 9 driven in rotation as shown at 10 by a set of gears 11 which are driven in rotation as shown at 12 by a main motor 13.

The extruder 7 having a forced feed is associated with a degassing pump 14 driven by a motor 15.

The intimate mixture having a selected particle size comprising the thermoplastic material and its fillers is driven from the inlet to the outlet of the extruder 7 by the screw 9. By the combined action of the source of heat 8, the mixture is brought to a molten state which homogenizes it still further.

Under these conditions, the rod 16 of soft material is delivered at the outlet of the extruder at a temperature in the neigbourhood of 140° C. and at a rate of at least °m per minute. The section of this rod of soft and hot material depends on the shape of the die placed at the outlet of the extruder. This section may be that of a solid cylinder, a square, a relatively flat rectangle, such as 17, or be rounded on its small sides such as at 18.

In the embodiment of the equipment shown in FIG. 1, which is more particularly intended for making shapes of small width, the rod 16 is immediately placed on a sheet 19 of a flexible material, for example paper, cardboard, or cloth, delivered by a reel 20 and if desired subjected to a pre-heating by infrared rays 21 so as to avoid, or at least limit, an excessive cooling of the rod 16.

As it is pulled forwardly by at least one of the rolls 22 of a calender 23, the paper 19 is formed by successive foldings, a first guide 24 raising the edge portions of the sheet, as diagrammatically represented at 25, and a second guide 26 folding the edge portions over onto each other so as to envelop completely and continuously the rod, as diagrammatically represented by the arrows 27.

The rod enveloped in this way is conveyed to a roll of the calender without having been subjected to the least mechanical stress, and consequently with no risk of distortion or tearing. To achieve this, it is quite obvious that the rate at which the protective sheet 19 is drawn along by the roll 22 is equal to the rate of extrusion of the rod 16.

As the distance between the die of the extruder 7 and the calendering line 23 is short and as the rod 16 is not subjected to any specific cooling, said rod enveloped by its protective sheet 19 is taken up by the rolls 22 of the calender while it is at a temperature of the order of 100° to 120° C., i.e. at a temperature suitable to enable it to be worked, compressed and formed.

In any case, the distance between the die of the extruder and the calendering line 23 may be determined, namely lengthened or shortened, in fact as a function of the ideal temperature at which the rod enveloped by its sheet must be presented at the entrance of the first calendering rolls.

When it passes between the rolls of the calender, the sheet 19 itself adheres to the core of thermoplastic material merely by the effect of the pressure exerted by the rolls.

If desired, in order to facilitate the adhesion, one or more of the rolls 22 are subjected to a continuous cooling by water.

As it emerges from the last pair of rolls of the calendering line, the flat composite structure 28 formed by the core of thermoplastic material, which may or may not contain a filler, completely enveloped by its protective sheet, is immediately conveyed to a forming line 29 in which the flat structure is progressively brought to the desired section or shape as diagrammatically represented at 31 and then 32, by passage between a plurality of successive pairs of rolls 30.

The flat composite structure 28 is easily worked, and therefore deformable, between the rolls, since it leaves the calendering line at a high temperature and it enters the forming line at an ideal working temperature which may be between 80° and 100° C.

After the composite structure has been formed into its final section, for example the L-section structure diagrammatically shown at 32, the composite structure is cut by cutters 33 into sections of the desired length.

As a concrete example, to manufacture an L-section element having a thickness of 3 mm and a developed length of 70 mm, which will therefore be folded to produce two flanges at a right angle and having a width of 35 mm each, there is extruded a mixture of 54% high-density polyethylene and 46% paper fibre associated with a minute amount of aluminium waste prodcts which is delivered at the rate of 20 m per minute in the form of a cylindrical rope or rod having a diameter of 8.17 mm.

This rod emerges from the extruder at the temperature of 140° C. and is immediately placed on a sheet of kraft paper 160 mm wide which is pulled by the first pair of rolls of the calender at the rate of 20 m per minute.

After calendering and forming into the shape of an L-section element by the rolls of the forming line, the L-section element weighs 200 g per linear metre.

With the same mixture delivered by the same extruder in the form of a rod of the same diameter at the same temperature of 140° C. and at the rate of 40 m per minute an L-section element can be manufactured which has the same width, half the thickness, 1.5 mm, and weighs 100 g per linear metre.

The two aforementioned L-section elements which are folded in the shape of an L after calendering, were obtained from the same mixture delivered by a conventional extruder whose production rate is 200 kg per hour.

In another manufacture, with again the same mixture achieved in in and delivered by another conventional extruder having a higher production rate of 800 kg per hour, a cylindrical rod having a diameter of 8.17 mm was delivered at the rate of 80 m per minute and had, after calendering, a flat shape 70 mm wide and 3 mm thick and weighing 200 g per linear metre.

At the end of the equipment, this flat strip was, as in the preceding examples, folded and formed into an L-section element of dimensions 35×35×3 mm.

In other words, the L-section element obtained in the 3rd example has the same technical properties as that obtained in the 1st example but is however produced four times quicker. This therefore shows that the limits of the practice of the invention are those of the production units (extruder) and not those of the materials employed for forming the core and the covering.

By way of example, it is recalled that the same L-section element made directly by extrusion from a V-section die can only emerge from the die at a rate in the neighbourhood of 5 m per minute, the L-section element produced having moreover a finish which is hardly aesthetic and mechanical properties which are distinctly inferior to those of the L-section element formed from the composite structure of the invention.

For example, a flat strip having a length of 380 mm supported only at its two ends is subjected in its middle part to vertical upward pressures (by means of weights) and the deflection of each specimen is measured in hundredths of a millimeter.

Various specimens were tested, the first having been manufactured according to the conventional direct extrusion technique, the others resulting from the carrying out of the invention with varying thicknesses of enveloping paper.

A deflection of 5 mm is reached with a weight of 50 grams for the conventional L-section element, which is consequently uncovered, with a weight of 160 grams for a covering 0.15 mm thick, with a weight of 300 grams for a covering 0.4 mm thick and lastly with a weight of 450 grams for a covering 0.6 mm thick.

Figure 2:
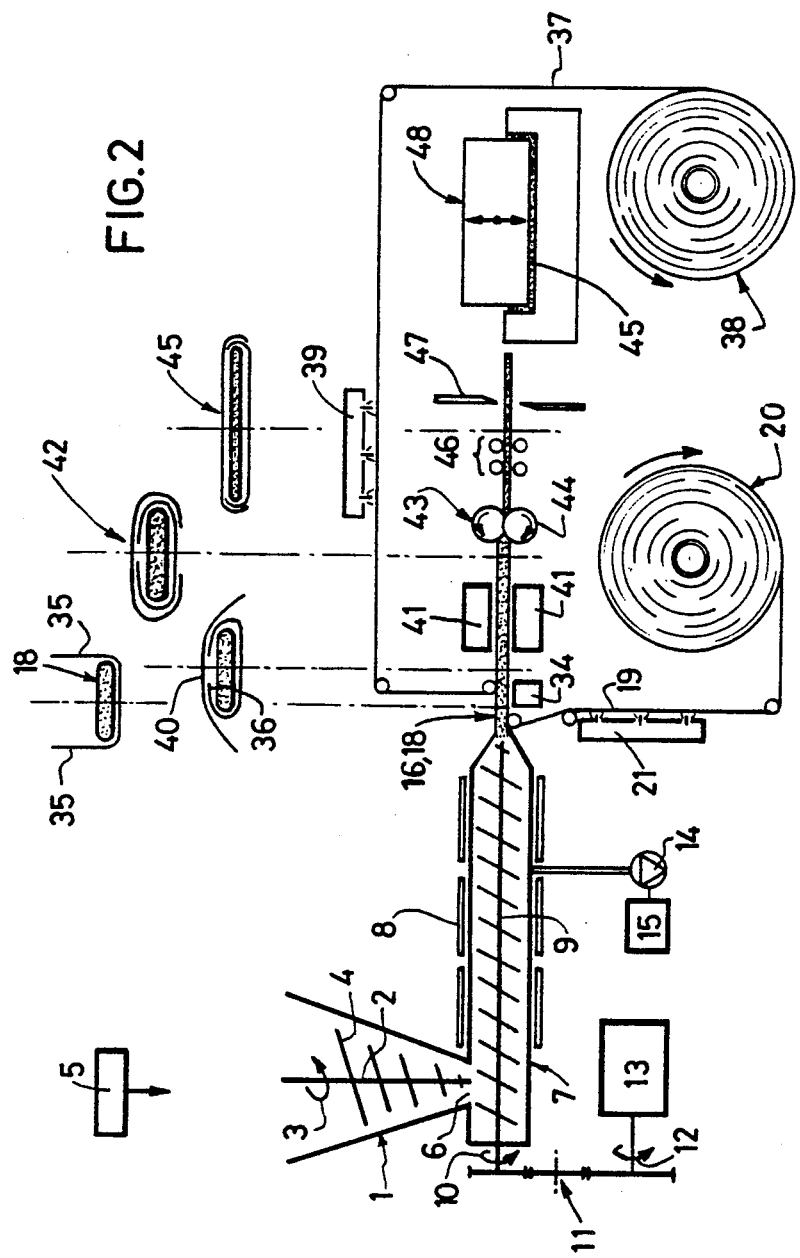
FIG. 2 is a diagrammatic view of a second embodiment of equipment for carrying out the method of the invention, which embodiment is more particularly provided for manufacturing plates enveloped by a first lower support and by a second upper support covering the rod, the longitudinally extending edge portions of the second support overlapping those of the first support after calendering.

The embodiment of the equipment shown in FIG. 2 is for the the manufacture of composite structures whose covering is formed by two sheets which overlap, and said equipment is consequently more particularly for the manufacture of plates of great width.

In this equipment, the units and elements having a reference numeral between 1 and 15 are identical to those of the equipment shown in FIG. 1.

The die of the extruder 7 delivers a hot rope or rod of softened material, either in the form of a cylinder 16 or in a more ovalized form 18, this rod being in any case immediately placed on a first protective support 19 delivered from a reel 20 and if desired pre-heated by infrared rays 21.

This rod-carrying support 19 is subjected to a first forming operation in a device 34 which raises the two edge portions of the sheet 19, as shown at 35, and folds them over at 36 onto the rod 8.

Immediately after, a second support 37 of the same type as the sheet 19 delivered by a reel 38 and if desired pre-heated by infrared rays 39, is applied at 40 on the partly covered rod.

By passing through a second forming device 41, the two sheets 19 and 37 are applied more closely against the rod 18 and are themselves in partly overlapping relation so as to provide the arrangement generally represented by the arrow 42.

The rod protected in this way is shifted to a calendering line 43 in which at least the first pair of rolls 44 pull on at least the lower sheet 19 at a rate equal to the rate of extrusion of the rod.

The pressure or pressures exerted by the rolls 44 render the rod thinner and the rod assumes the more flattened shape generally indicated by the arrow 45 and at the same time the sheets 19 and 37 adhere to the core of thermoplastic material.

It is clear that the width of the sheets 19 and 37 was in this respect determined as a function of the section, and more precisely as a function of the width of the object 45 to be delivered at the exit of the calender.

The width of the sheets 19 and 37 is indeed so chosen that in the final section of the plate 45 the longitudinally extending edge portions are covered with sheets 19 and 37 the edge portions of which overlap each other.

Consequently, the passage through the calender 43 will not result in any flow or seeping of the thermoplastic material since the latter remains constantly trapped between the sheets 19 and 37 which are always in overlapping relation at least partly.

After calendering, the plate may if desired be formed between the rolls of a forming line 46 and then it is cut to length by cutters 47.

In another embodiment, the plate 45 cut to length is then formed in a press device 48.

The shaping of the plate by forming or by pressing is still possible since, as in the equipment shown in FIG. 1, the plate 45 leaves the last pair of rolls of the calender at sufficiently high temperature to be worked and deformed.

All the products, shapes or plates, manufactured in one of the equipments shown in FIGS. 1 or 2 have the common feature of comprising a core of thermoplastic material, which may or may not contain a filler completely and continuously enveloped by one or two sheets of a flexible material which also covers the two longitudinally extending edges of the finished product.

This product therefore has a quite characteristic appearance in that the core of thermoplastic material is absolutely invisible under the protective sheet.

The finished shape may be delivered in the most varied sections, for example in the form of a flat strip 49 (FIG. 3a), an L-section element 50 (FIG. 3b), a U-section element 51 (FIG. 3c), a tube having a rectangular or square section 52 (FIGS. 3d and 3e respectively) the two edges of which remain free or are on the contrary fastened by adhesion or some other technique, a triangular beam 54 (FIG. 3f), a shock-absorbing L-section element 55 whose flanges are slightly formed over toward the centre of the L-section element (FIG. 3g), another shock absorbing L-section element 56, the flanges of which extend to the centre of the web (FIG. 3h), an L-section beam 57 (FIG. 3i), and the modification 58 of said beam with one edge bearing against the web (FIG. 3j), a modification of a beam of rectangular section in which a small side has a double thickness 61 (FIG. 3k).

The finished plate may have raised edge portions 59 (FIG. 3l) or have a crenellated section 60 (FIG. 3m).

The various aforementioned products may be used in different industries, such as those of wrapping, packing (shapes) and handling (plates and pallets for carrying loading crates and packages.)

It must be understood that the scope of the invention is not intended to be limited to the modes of application or to the embodiments mentioned and various modifications may be envisaged without departing from the scope of the invention as defined in the claims.

I claim:

1. A method for continuously manufacturing products having an inner core of thermoplastic material enveloped and protected by an outer sheet of a flexible material, said method comprising in combination the steps of: heating said thermoplastic material to its softening temperature in a heating means having an outlet for the softened thermoplastic material, supplying an elongated flexible and protective sheet means longitudinally adjacent to said outlet, said sheet having a longitudinally extending intermediate base portion and longitudinally extending lateral portions adjoining opposite sides of said base portion for supporting the thermoplastic material emerging from said outlet in the form of a rod on said base portion of said sheet as said rod emerges from said outlet, raising said longitudinally extending lateral portions of said sheet adjoining opposite sides of said base portion for arresting lateral flow of said softened thermoplastic material of said rod, enclosing said rod within said sheet by wrapping said sheet completely around said rod transversely of said rod and causing each longitudinally extending edge portions of said sheet to overlap each other on top of said rod for preventing escape of said thermoplastic material of said rod, conveying said rod and said sheet to calendering rolls by pulling on said sheet, calendering said rod and said sheet enveloping said rod, and cutting the rod and the sheet enveloping said rod.

2. A method for continuously manufacturing products having a core of thermoplastic material enveloped and protected by sheet means of a flexible material, said method comprising in combination the steps of: heating said thermoplastic material to its softening temperature in heating means having an outlet for the softened thermoplastic material, supplying upper and lower elongated flexible and protective sheets with at least said lower sheet longitudinally adjacent to said outlet, said lower sheet having a longitudinally extending intermediate base portion and longitudinally extending lateral portions adjoining opposite sides of said base portion, supporting the softened thermoplastic material which emerges from said outlet in the form of a rod onto said base portion of said lower sheet as said rod emerges from said outlet, raising said longitudinally extending lateral portions of said lower sheet adjoining opposite sides of said base portion for arresting lateral flow of said softened thermoplastic material of said rod, thereafter completely enveloping said rod with said sheets, with said upper sheet on top of said rod, and wrapping said sheets around said rod transversely of said rod and causing longitudinally extending portions of said sheets to overlap each other on top of and above said rod for preventing escape of said thermoplastic material of said rod, conveying said rod and said sheets to calendering rolls by pulling said lower sheet, calendering said rod and said sheets enveloping said rod, and cutting the rod and the sheets enveloping said rod.

3. A method according to claim 1, wherein said heating means comprises an extruder and said thermoplastic material is heated in the extruder to about 140° C., and said calendering is effected on said rod at a temperature of said rod of about 100° to 120° C.

4. A method according to claim 2, wherein said heating means comprises an extruder and said thermoplastic material is heated in the extruder to about 140° C. and said calendering is effected on said rod at a temperature of said rod of about 100° to 120° C., said overlapping portions overlapping one another to a sufficient extent transversely of said rod before said calendering to remain in overlapping relation to one another throughout the method notwithstanding manufacture of a wide product.

5. A method according to claim 4, further comprising degassing said thermoplastic material in said extruder.

6. A method according to claim 1, wherein the thermoplastic material is softened in an extruder comprising said heating means.

7. A method according to claim 6, wherein the thermoplastic material is extruded at a maximum temperature of about 140° C.

8. A method according to claim 1, wherein the calendering of the enveloped rod is carried out at a temperature of about 100° to 120° C.

9. A method according to claim 1, further comprising imparting a cross-sectional shape to the rod and sheet assembly, after said calendering, said step being carried out at a temperature of about 80° to 100° C.

10. A method according to claim 6, wherein the rod is extruded at a rate of at least 20 m per minute.

11. A method according to claim 1, wherein said sheet means is of a material selected from the group comprising cardboard, cloth, a web of fibreglass, a web of a cardboard-polyethylene complex, and a web of cardboard-aluminium-polyethylene complex.

12. A method according to claim 1, wherein said thermoplastic core includes filler means selected from the group comprising fibres of cloth, paper, cardboard, other cellulosic fibres, fibres of glass, asbestos, wood, powder of talc, kaolin, or silica, aluminium, wood sawdust, and wherein said core is composed of at least 40% of thermoplastic material.

13. A method according to claim 3, wherein said calendering step is followed by a forming operation on said calendered rod and the enveloping sheet at a temperature of about 80° to 100° C. for imparting the cross-sectional shape to said rod and said sheet.

14. Equipment for continuously manufacturing products having a core of thermoplastic material enveloped and protected by sheet means of a flexible material, said equipment comprising in combination: an extruder having an outlet for delivering a thermoplastic material in the shape of a rod, said extruder including heating means for heating said thermoplastic material in said extruder to such temperature that said rod emerges from said outlet in a pasty state; means for supplying sheet means adjacent said outlet for receiving said rod as said rod emerges from said outlet; means for wrapping said sheet means completely around said rod transversely of said rod in such manner that longitudinally extending edge portions of said sheet means overlap each other on said rod; means for pulling on said sheet means at the rate of extrusion of said rod from said extruder; calendering rolls for calendering said rod and said sheet means when said pulling means have conveyed said rod and said sheet means to said calendering rolls; and means for cutting said rod and said sheet.

15. Equipment according to claim 14, wherein said sheet means is a single sheet of elongated shape and said means for supplying the sheet means supply said single sheet under said rod so as to support said rod, and said means for wrapping comprise means for raising lateral portions of said single sheet and folding said raised lateral portions onto the top of said rod in such manner that two edge portions of said sheet overlap each other on top of said rod.

16. Equipment according to claim 14, wherein said sheet means comprise an upper sheet of elongated shape and a lower sheet of elongated shape and said means for supplying the sheet means supplies said lower sheet under said rod to support said rod, and said means for wrapping comprise means for raising lateral portions of said lower sheet and folding said raised lateral portions over the top of said rod and causing edge portions of said upper sheet and said lower sheet to overlap one another on said rod.

17. Equipment according to claim, 14 further comprising forming means following on said calendering rolls for imparting the desired cross-sectional shape to said calendered rod and sheet means.

* * * * *